United States Patent
Sharma et al.

(10) Patent No.: US 11,619,993 B2
(45) Date of Patent: Apr. 4, 2023

(54) SYSTEMS AND METHODS FOR GAZE-TRACKING

(71) Applicant: Microsoft Technology Licensing, LLC, Redmond, WA (US)

(72) Inventors: Jatin Sharma, Sammamish, WA (US); Jonathan T. Campbell, Redmond, WA (US); Jay C. Beavers, Duvall, WA (US); Peter John Ansell, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 28 days.

(21) Appl. No.: 17/234,493

(22) Filed: Apr. 19, 2021

(65) Prior Publication Data

US 2022/0334637 A1    Oct. 20, 2022

(51) Int. Cl.
  *G06F 3/01*    (2006.01)
  *G06T 7/73*    (2017.01)
  (Continued)

(52) U.S. Cl.
  CPC ............ *G06F 3/013* (2013.01); *G06F 3/012* (2013.01); *G06N 3/04* (2013.01); *G06N 3/08* (2013.01);
  (Continued)

(58) Field of Classification Search
  CPC ........... G06F 3/013; G06F 3/012; G06N 3/04; G06N 3/08; G06T 7/73;
  (Continued)

(56) References Cited

U.S. PATENT DOCUMENTS

| 6,152,563 | A | 11/2000 | Hutchinson et al. |
| 10,884,494 | B1 | 1/2021 | Lagies et al. |

(Continued)

FOREIGN PATENT DOCUMENTS

| CN | 110705504 A | 1/2020 |
| CN | 112132755 A | 12/2020 |
| CN | 112148112 A | 12/2020 |

OTHER PUBLICATIONS

"Head Pose Estimation", Retrieved from: https://www.youtube.com/watch?v=NIgKWr4OxoE&t=8s, Sep. 26, 2016, 3 Pages.

(Continued)

*Primary Examiner* — Grant Sitta

(57) ABSTRACT

Systems and methods are provided for predicting an eye gaze location of an operator of a computing device. In particular, the method generates an image grid that includes regions of interest based on a facial image. The facial image is based on a received image frame of a video stream that captures the operator using the computing device. The image grid further includes a region that indicate rotation information of the face. The method further uses a combination of trained neural networks to extract features of the regions of interest in the image grid and predict the eye gaze location on the screen of the computing device. The trained set of neural networks includes a convolutional neural network. The method optionally generate head pose pitch, roll, and yaw information to improve accuracy of predicting the location of an eye gaze.

20 Claims, 9 Drawing Sheets

(51) Int. Cl.
*G06N 3/04* (2006.01)
*G06N 3/08* (2006.01)

(52) U.S. Cl.
CPC ...... *G06T 7/73* (2017.01); *G06T 2207/10024* (2013.01); *G06T 2207/20084* (2013.01); *G06T 2207/30201* (2013.01)

(58) Field of Classification Search
CPC . G06T 2207/10024; G06T 2207/20084; G06T 2207/30201; G06V 10/454; G06V 40/18; G06K 9/6271
See application file for complete search history.

(56) References Cited

U.S. PATENT DOCUMENTS

| | | | | |
|---|---|---|---|---|
| 11,301,969 | B1* | 4/2022 | Khan | G06F 3/013 |
| 2012/0230547 | A1 | 9/2012 | Durnell et al. | |
| 2017/0119298 | A1 | 5/2017 | Cheung | |
| 2017/0364149 | A1 | 12/2017 | Lu et al. | |
| 2020/0050265 | A1 | 2/2020 | Krishnakumar | |
| 2020/0097076 | A1 | 3/2020 | Alcaide et al. | |
| 2020/0121179 | A1 | 4/2020 | Prusky et al. | |
| 2020/0169693 | A1* | 5/2020 | Silveira | G06V 10/764 |
| 2020/0202561 | A1 | 6/2020 | Liu et al. | |
| 2020/0218345 | A1 | 7/2020 | Liu et al. | |
| 2020/0393896 | A1 | 12/2020 | Li et al. | |
| 2021/0056293 | A1* | 2/2021 | Yin | G06V 10/82 |
| 2022/0330863 | A1 | 10/2022 | Sharma et al. | |

OTHER PUBLICATIONS

Mallick, Satya, "Head Pose Estimation using OpenCV and Dlib", Retrieved from: https://learnopencv.com/head-pose-estimation-using-opencv-and-dlib/, Sep. 26, 2016, 9 Pages.

Sharma, et al., "Towards Hardware-Agnostic Gaze-Trackers", In Journal of Computing Research Repository, Oct. 11, 2020, 9 Pages.

Gudi, et al., "Efficiency in Real-time Webcam Gaze Tracking", In the Repository of arXiv:2009.01270v1, Sep. 2, 2020, 15 Pages.

"International Search Report and Written Opinion Issued in PCT Application No. PCT/US22/023187", dated Jul. 19, 2022, 11 Pages.

"International Search Report and Written Opinion Issued in PCT Application No. PCT/US22/024250", dated Aug. 1, 2022, 12 Pages.

Akinyelu, et al., "Convolutional Neural Network-Based Methods for Eye Gaze Estimation: A Survey", IEEE Access, vol. 8, Jul. 30, 2020, pp. 142581-142605.

* cited by examiner

SYSTEMS AND METHODS FOR GAZE-TRACKING

BACKGROUND

Computing devices with a camera have become popular as remote video chat and meetings have become a common place. For instance, smartphones, tablet computers, laptop computers, and desktop computers feature embedded RGB (Red-Green-Blue) cameras to take video and still images for communications and for storage. Use of eye-gaze as input to the computing devices is gaining popularity as the computing devices are used in situations where users do not use hands to enter input to the computing devices. Example of such usage may include user interactions with the computing devices (e.g., a car navigation) while driving a car, a multi-tasking environment where the user may be editing documents during a video conference by operating a video conference application, and the like. Gaze-tracking provides a sequence of real-time user input to the computing devices.

Demand for processing eye-gaze data on consumer-grade computing devices has rapidly increased. Processing eye-gaze with accuracy is computing resource intensive however. Processing eye-gaze includes capturing live video image data that include at least eyes of the user, processing the live video data to extract eye-gaze and determine coordinates of the eye-gaze on the screen. Processing eye-gaze has historically required specialized device for real-time processing. For example, commercial-grade devices may include a pair of an Infra-red (IR) light emitter and an IR light sensor in a specialized hardware for processing image data. Such specialized hardware is not ubiquitously available in the commercial computing devices. Accordingly, the pair need to be purchased separately, connected and mounted with the computing device at a specific location and calibrated before they could function accurately. The need puts the burden of cost and system configuration on the user and is a major deterrence from widely becoming available. Extending capability of processing eye-gaze to consumer-grade computing device would require balancing the accuracy and the performance. Thus, developing a technology that improves accuracy while also improving in processing eye-gaze on consumer-grade computing devices would be desirable.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, the above and other issues are resolved by determining an eye-gaze location by generating an image grid (e.g., a mosaic of images) based on a facial image and determine the eye-gaze location based on the image grid using networks based on machine learning. The term "eye-gaze" location refers to a location where one or more eyes (or collectively) of the user looking at. The location may be expressed as a two-dimensional coordinate on a screen display of a computing device. The aspects includes receiving a facial image of a user operating a computing device and generating the image grid. The computing device may include an RGB camera to generate the facial image by taking a video or a picture of the user operating the computing device. The term "image grid" may refer to an image that includes two or more distinct regions of interest (e.g., a left eye, a right eye, a nose, a lip, a face, and the like). The regions of interest may correspond to parts of the facial image. The "image grid" may also include rotation correction information of the facial image. The term "gaze-tracking" refers to a way of receiving eye-gaze locations as real-time input as the user interacting with the computing device.

The aspects include processing the image grid using a sequence of networks including at least a convolutional network for feature extraction and a fully connected neural network for reducing dimensions of a multi-dimensional vector for generating an eye-gaze location data.

The aspects further include determining a head pose information. The head pose information includes a direction of the head of the user at the time the computing device captures the facial image. The disclosed technology inputs the head pose information (e.g., pitch, roll, and yaw) along with output of the convolutional network to the fully connected neural network. The integration of the head pose information enhances accuracy of eye-gaze locations.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIG. 1 illustrates an overview of an example system for gaze tracking in accordance to aspects of the present disclosure.

FIGS. 2A-B illustrate examples of a facial image and extracted regions of interests in accordance with aspects of the present disclosure.

DETAILED DESCRIPTION

Figure 1:
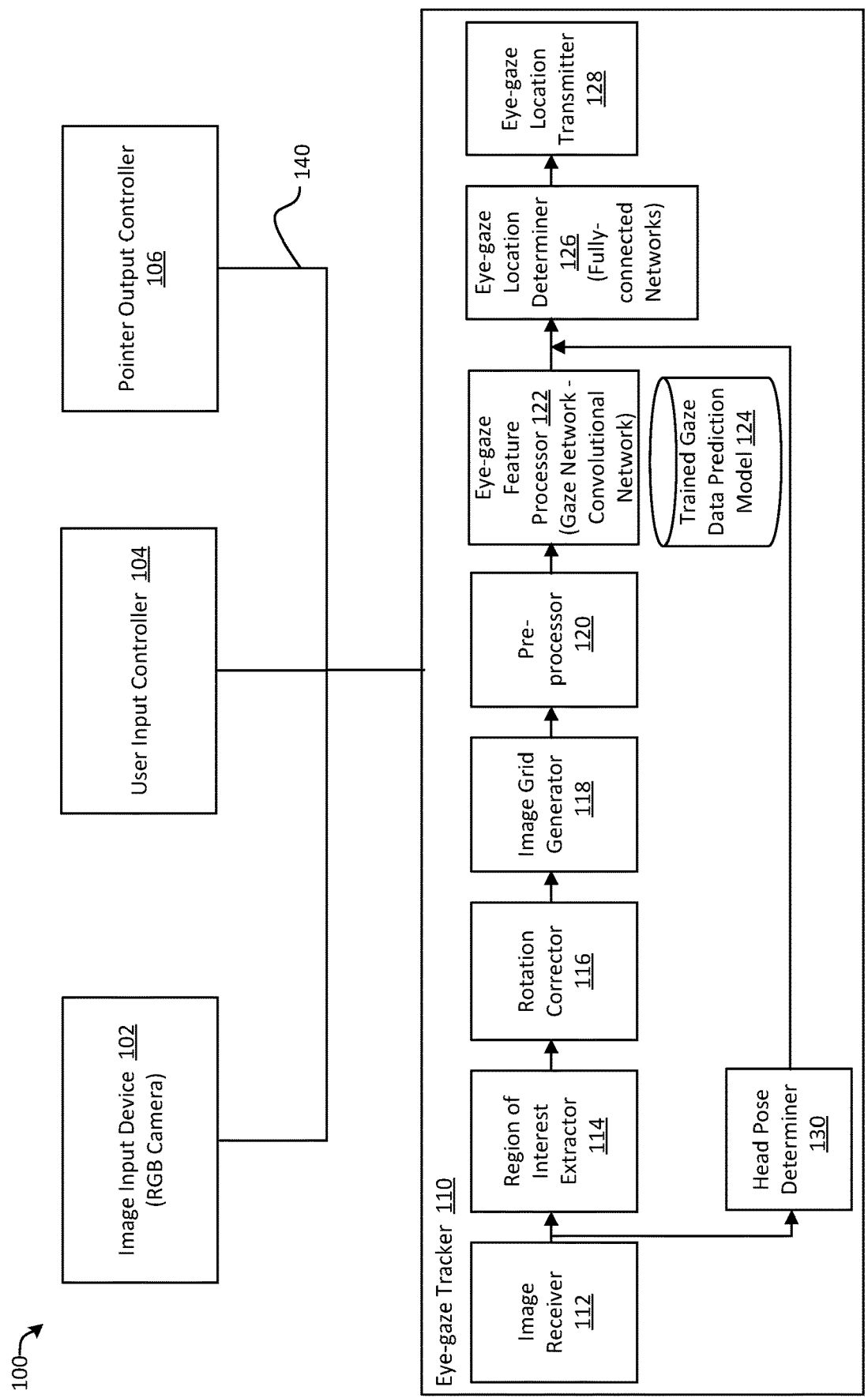

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Gaze tracking as input to a computing device has gaining popularity as various types of computing devices (e.g., smartphones, tablets, laptop computers, desktop computers, and the like) embeds cameras. For example, gaze tracking enables users with motor-neuron disabilities to control their computing devices. Gaze tracking further enables touchless interactions with the computing devices in areas of applications including medical doctors accessing patient information.

Traditional gaze-tracking used specialized hardware (e.g., infrared sensors) and devices to receive and process the gaze tracking because of intensiveness of determining eye-gaze location based on video or picture image as input to the devices. As more computing devices for the general consumer includes RGB cameras for receiving video or picture image, demands for the computing devices to provide gaze-tracking for a variety of applications have increased.

In aspects, processing eye-gaze for gaze tracking includes receiving a facial image (or a frame of facial image video), extracting regions of interests (e.g., a face, a left eye, a right eye, nose, and the like) from the facial image, and determining a gaze location by analyzing the extracted regions of interests. Accurately determining eye-gaze location may require processing the regions of interests. To improve performance, some specialized systems process the regions of interests concurrently by use of enhanced computing resources.

In aspects, use of trained deep neural networks improves accuracy in predicting eye-gaze locations based on facial images. For example, the deep neural networks may include a sequence of processing the facial images in vector representations in a convolutional neural network following by a set of fully connected neutral networks. The predicted eye-gaze locations may be in a two-dimensional expression that specifies a location on a display screen of the computing device. Some traditional systems use a set of the deep neural networks for concurrently processing respective regions of interests. A problem arises in computing resources needed to accurately while minimizing latency of gaze tracking as the user expects real-time response from gaze-input to use the computing devices.

The present application solves the above issue by generating an image grid based on a facial image, processing the image grid using a deep neural network, and determining an eye-gaze location for gaze tracking. The image grid includes parts of regions of interests as extracted from the facial image. Use of the image grid enables use of the deep neural network on multiple regions of interests in the image grid in parallel and in an integrated manner.

As discussed in more detail below, the present disclosure relates to gaze tracking. In particular, the gaze tracker receives a video stream of a facial image of a user as the user operates a computing device and iteratively tracks eye-gaze locations. The gaze tracker extracts regions of interests from the facial image, and generates an image grid including the regions of interests. The present disclosure further determines an eye-gaze location based on the image grid using a deep neural network. The deep neural network includes at least a convolutional neural network and a fully connected neural network. The eye-gaze location may be represented in two-dimensional coordinates that corresponds to a location on the display of the computing device. Use of the image grid through the deep neural network improves accuracy and performance of determining the eye-gaze location.

FIG. 1 illustrates an overview of an example system 100 for gaze tracking in accordance with aspects of the present disclosure. System 100 represents a system for determining an eye-gaze location based on a facial image received from an RGB camera of a computing device. System 100 includes image input device 102 (e.g., an RGB camera), user input controller 104, pointer output controller 106, eye-gaze tracker 110, connected by a connection 140. System 100 may include a computing device e.g., a smart phone, a tablet, a laptop computer, a desktop computer, and the like).

The image input device 102 receives a facial image of a user of the example system 100. In aspects, the image input device 102 includes but not limited to an RGB camera, which captures image data in the red-green-blue format. The image input device 102 may be attached to, embedded in, and/or in proximity to the system 100 for capturing a facial image of the user interactively using the system 100. In aspects, the image input device 102 captures video data and/or a series of frames of image data. The image input device 102 transmits the captured image data (e.g., a facial image) to an image receiver 112 of the eye-gaze tracker 110. The connection 140 connects parts of the system 100 including the image input device 102, the user input controller 104, the pointer output controller 106, and the eye-gaze tracker 110. The connection may be a data bus in a computing device, for example.

The user input controller 104 controls user input as the user interacts with the system 100. In aspects, user input may include a mouse click, a keyboard input, an eye-gaze input, and the like. The user input may be based on user input data, which may include a two-dimensional coordinate (x and y values) on a display and a type of user selection as an input.

The pointer output controller 106 controls pointer output on a display of the system 100. For example, the pointer output may be a cursor icon that indicates an eye-gaze location on the display. As the user moves a location where the user looks at on the screen, the pointer output moves to a next eye-gaze location.

The eye-gaze tracker 110 tracks an eye-gaze of the user. The eye-gaze tracker 110 includes image receiver 112, region of interest extractor 114, rotation corrector 116, and image grid generator 118. The eye-gaze tracker 110 further includes preprocessor 120, eye-gaze feature processor 122, trained gaze data prediction model 124, eye-gaze location determiner 126 and eye-gaze location transmitter 128, and head pose determiner 130.

The image receiver 112 receives a facial image from the image input device 102 (the RGB camera). In aspects, the facial image includes an image of a face of the user looking at the display of the system 100. The facial image at least includes one or more eyes of the user. In some aspects, the facial image may be a color in the RGB format. In some other aspects, the facial image may be some other color format, a monotone, or in a grayscale format. The facial image may be a frame of a captured video stream.

The regions of interest (ROI) extractor 114 extracts regions of interest from the facial image. In aspects, the regions of interest may include one or both eyes and a face of the user. The region of interest extractor 114 extracts respective regions. In aspects, the one or more eyes include the pupil and the iris of the respective eyes, which are used to determine an eye-gaze location.

The rotation corrector 116 corrects the rotation of the eyes and other parts of the regions of interests using a geometric algorithm looking at the detected face landmarks and estimating the angle of rotation. In aspects, the rotation corrector 116 determines a rotational angle of the face and rotates the left eye and the right eye in the image grid to remove tilting of the eyes. Removal of the tilt of the eyes improves accuracy of the eye-gaze location. A rotation correction image may then be created using the extracted rotation information and face position within the frame to pass the rotation information more efficiently. Overall, this is a process of Rotation Decoupling where rotation information is first separated and then efficiently encoded in rotation correction image to be passed to the neural network. The separation of the rotations from the ROIs (e.g. face, left eye, right eye) makes it easier for the neural network to learn high-level features and generalize well without needing to learn extracting the rotation information itself with accuracy. In aspects, the rotational correction image includes a rectangle or some other shape, which indicates a rotational angle of the face in the face image as well as size, distance, and location relative to the camera. The rotational correction image may be used for correcting rotation of the face for accurately determining an eye-gaze location.

The image grid generator 118 generates an image grid based on the regions of interest. In aspects, the image grid may be in a predetermined format. For example, the predetermined format may include four images in two rows and two columns. The top left image may be an image of the left eye, the top right image may be an image of the right eye, the bottom left may be a face, and the bottom right may be a rotational correction image. In aspects, the image grid includes a 2-by-2 grid, the total of four areas indicating: 1) the left eye, 2) the right eye, 3) the face, and 4) the rotational correction image. The eyes indicate eyeball orientation, the face indicates the face orientation, and the rotational correction image provides face position, rotation, size, and distance. In some other aspects, the image grid may be a grid of higher dimensions, 3-by-3 grid, for example. In the 3-by-3 grid, for example, there may be 1) the left eye, 2) the right eye, 3) a nose, 4) lips, 5) a forehead, 6) the face, 7) the left ear, 8) the right ear, and 9) the rotational correction image. In aspects, the image grid may include a depth 3 and a pixel dimensions of 1024 by 1024 (3×1024×1024), for example.

The pre-processor 120 preprocesses the image grid for further processing using the deep neural network. In aspects, the pre-processor 120 includes modifying a color space. In aspects, the pre-processor 120 may transform the RGB color space into non-RGB color space (e.g., HSV, YCbCr, and LAB). For example, unlike the RGB color space, the YCbCr color space encodes color and intensity information separately. The YCbCr color space may perform better than the RGB color space in detecting skin of the face. Accordingly, the deep neural network may predict features of the eye-gaze based on the YCbCr color space.

The pre-processor 120 may further performs data augmentation. In aspects, the data augmentation synthetically creates additional data for determining an eye-gaze location by generating small variations of the original image grid. The data augmentation may generate color images by varying brightness, contract, saturation, hue, and the like. Additionally or alternatively, the data augmentation may include a positional augmentation based on image mirroring and/or synthetically generating various facial imagery with intermediate head-poses. In aspects, the disclosed technology generates additional images that have intermediate head-poses or facial rotations and adjust the ground-truth gaze-data accordingly. The pre-processor 120 may generate a vector matrix of a dimension of 3×1024×1024.

The eye-gaze feature processor 122 processes the image grid in a vector form to determine features of an eye-gaze location. In aspects, the eye-gaze feature processor 122 includes a trained convolutional neural network as a deep neural network. The eye-gaze feature processor 122 may use a trained set of a gaze data prediction model 124. The image grid includes at least the left eye, the right eye, and the face as a facial data. The eye-gaze feature processor 122 concurrently processes all parts of the image grid as an image using a convolutional neural network. In aspects, the eye-gaze feature processor 122 uses features as detected in the face orientation portion of the image grid for enhancing accuracy of determining eye-gaze location using the two eye images. In aspects, dimension of input and output of the trained convolutional neural network may be distinct. For example, input to the convolutional neural network may be 3×1024×1024, while output from the convolutional neural network may include a vector matrix with a dimension of 512×7×7.

The eye-gaze location determiner 126 determines an eye-gaze location based on the output vector matrix from the eye-gaze feature processor 122. In aspects, the eye-gaze location determiner 126 may include a series of fully connected networks. For example, a first fully connected (FC) neural network may generate a vector in 128 dimensions. A second FC neural network reduces the dimensions from 128 to 64. A third FC neural network may further reduce the dimension from 64 to two. In the example, the eye-gaze location determiner 126 may output an eye-gaze location in two-dimensional coordinates (e.g., X-Y).

The eye-gaze location transmitter 128 transmits the eye-gaze location to the user input controller 104 as user input. Additionally or alternatively, the eye-gaze location transmitter 128 transmits the eye-gaze location to the pointer output controller 106.

In aspects, the eye-gaze tracker 110 includes the series of processes for determining the eye-gaze location iteratively as the image receiver 112 receives a facial image as a frame of a video stream. Accordingly, the pointer output controller 106 updates a location of an eye-gaze pointer on the display screen based on data received from the eye-gaze location transmitter 128.

Additionally, the eye-gaze tracker 110 may use a head pose to improve accuracy of determining eye-gaze locations. The head pose determiner 130 determines a head pose of the user based on the facial image. The head pose determiner 130 determines a direction associated with the head pose in a directional vector form and add to input for the eye-gaze location determiner 126 (a fully-connected neural network)

As will be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2B:
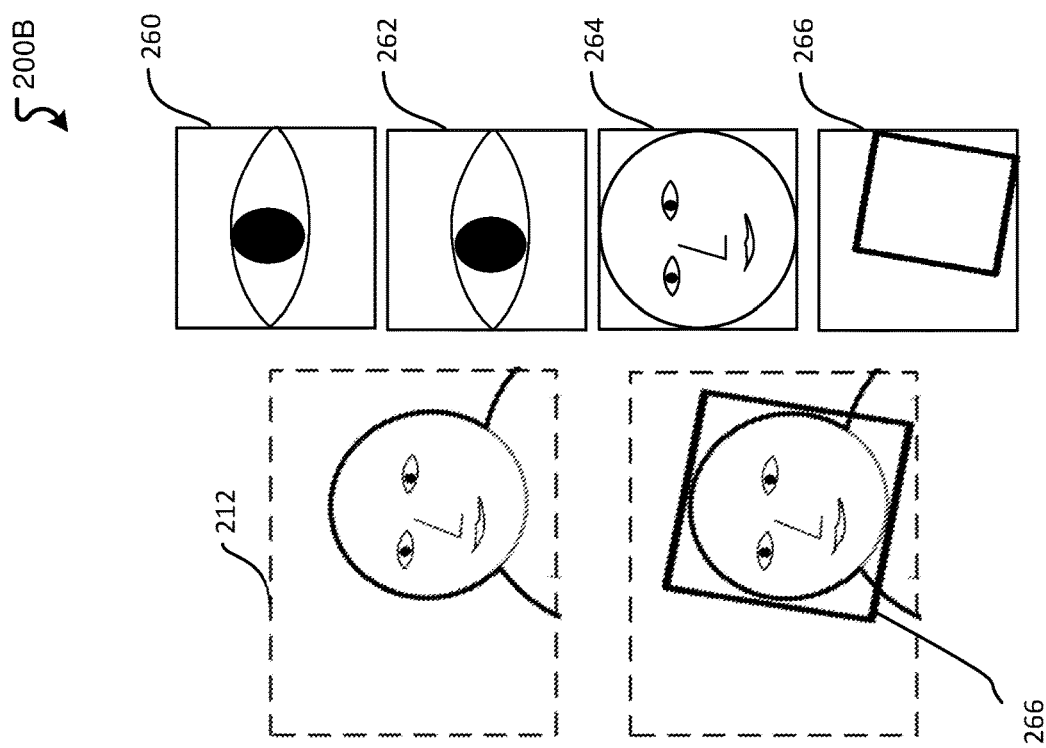
Figure 2A:
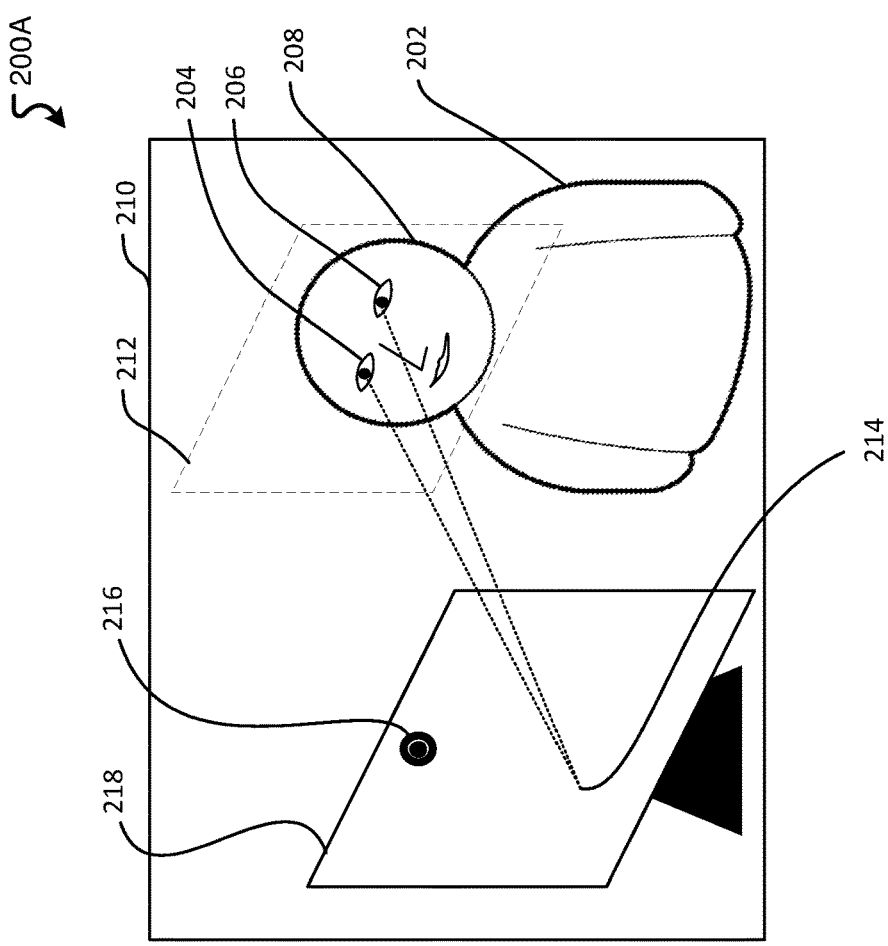

FIGS. 2A-B illustrate examples of a facial image and a set of regions of interest as based on the facial image according to the aspects of the present disclosure. FIG. 2A illustrates an example of a facial image as captured by the RGB camera according to aspects of the present disclosure. The facial image 200A includes an image of the user 202 interacting with a computing device. A frame 210 includes the image of the user 202. In aspects, a portion of the real-world view that falls under the camera's Field of View is captured as an image by the camera. Accordingly, the Regions of Interests (ROIs) are extracted and generated through the captured image. The image of the user 202 includes the right eye 204, the left eye 206, and the face 208. In aspects, the RGB camera, which attaches to a display of the computing device, may generate the facial image 200A in a RGB color space format. An FOV 212 indicates a captured image through camera's Field of View (FOV). A gaze point 214 represents a point the operator looks at a display 218. A camera 216 captures the image. In some aspects, in cases where additional camera sensors, an IR camera for example, are also available, additional information (e.g. depth information) may be used to generate as additional ROIs or information vectors.

FIG. 2B illustrates an example of an image captured by the camera while the operator exists in camera's FOV and a set of regions of interests according to the aspects of the present disclosure. The regions of interests 200B include various parts of the facial image 200A. The FOV 212 includes a facial image of the operator. The various parts are relevant to determining an eye-gaze location. In aspects, the regions of interests include the right eye 260, the left eye 262, and the face 264.

Additionally or alternatively, the rotational correction image 266 indicates a degree of rotation using a rectangular shape. The rectangular shape may be filled or unfilled. The shape may be non-rectangular but a geometric shape that indicates a degree of rotation. The disclosed technology detects and indicates a face region in the captured image using a rotated rectangle. In aspects, the disclosed technology applies a rotation correction mechanism, which detects facial landmarks of the face and aligns parts of the face with a standard well-positioned face template. A head rotation, however, may affect accuracy of an eye-gaze location in addition to eyeball orientation. In aspects, the disclosed technology separates the rotational correction information from the facial image and encodes the rotational correction information separately as an additional input (e.g., additional dimensions of a multi-dimensional vector) to the model for the deep neural network.

Figure 3:
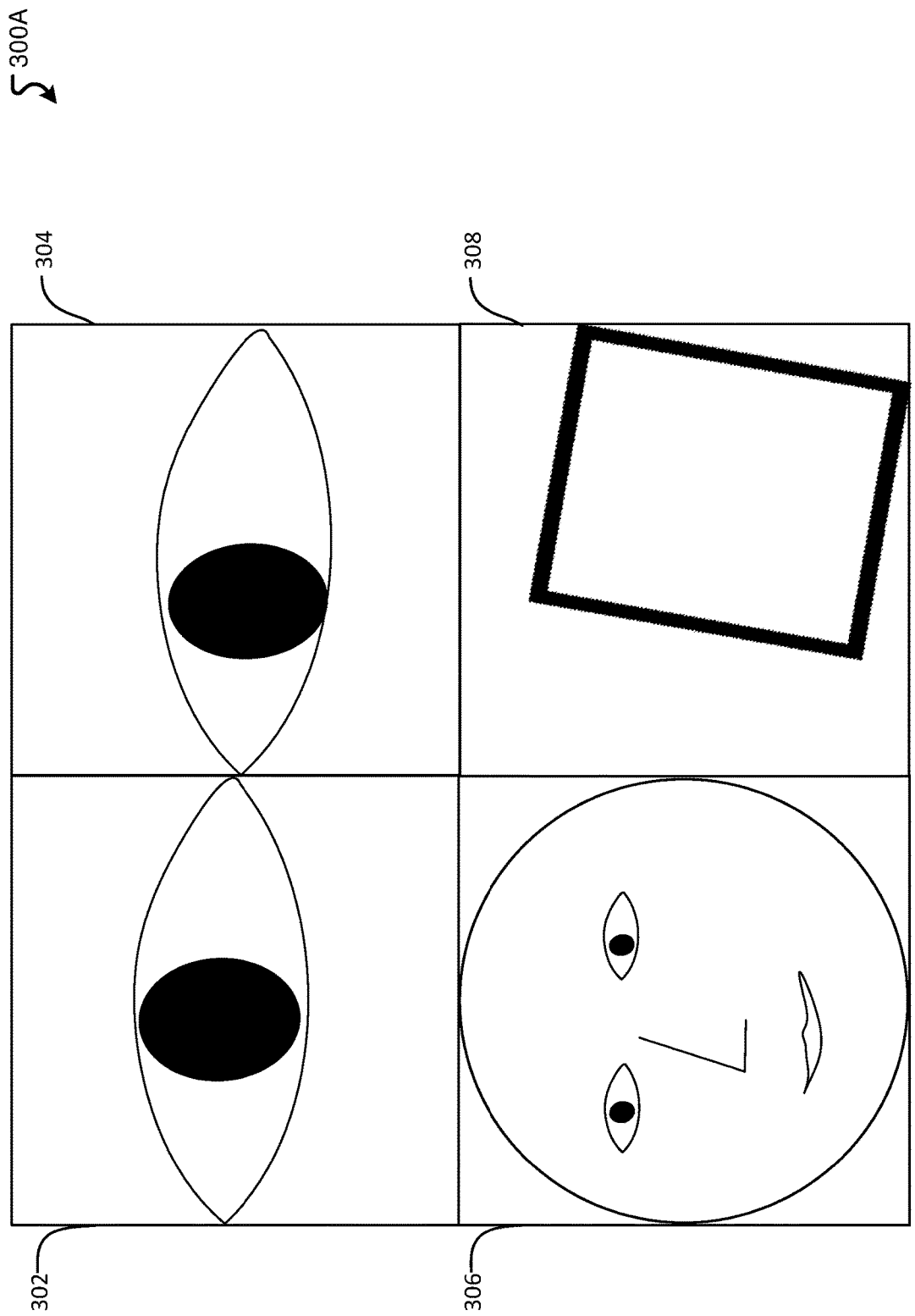
FIG. 3 illustrates an example of an image grid in accordance with aspects of the present disclosure.

FIG. 3 illustrates an example of an image grid in accordance with the aspects of the present disclosure. The image grid 300A includes four images, for example: the right eye 302, the left eye 304, the face 306, and the rotation correction information 308. The disclosed technology uses the image grid including rotation corrected regions of the interests as input to the deep neural network for determining an eye-gaze location. By including regions of interests in one image grid, the deep neural network may process all the regions in a concurrent manner and extract features. Use of the image grid reduces the need for computing resources as compared to processing each of the regions of interest concurrently by distinct deep neural networks.

Use of the image grid may improve accuracy of predicting the eye-gaze location as compared to concurrently processing the regions of interest using distinct neural networks. The disclosed technology applies results of feature extractions of one region of interest (e.g., the face) in the image grid to feature extractions of other regions of interest (e.g., the right eye and the left eye) based on a multi-dimensional vector in the deep neural network.

Figure 4:
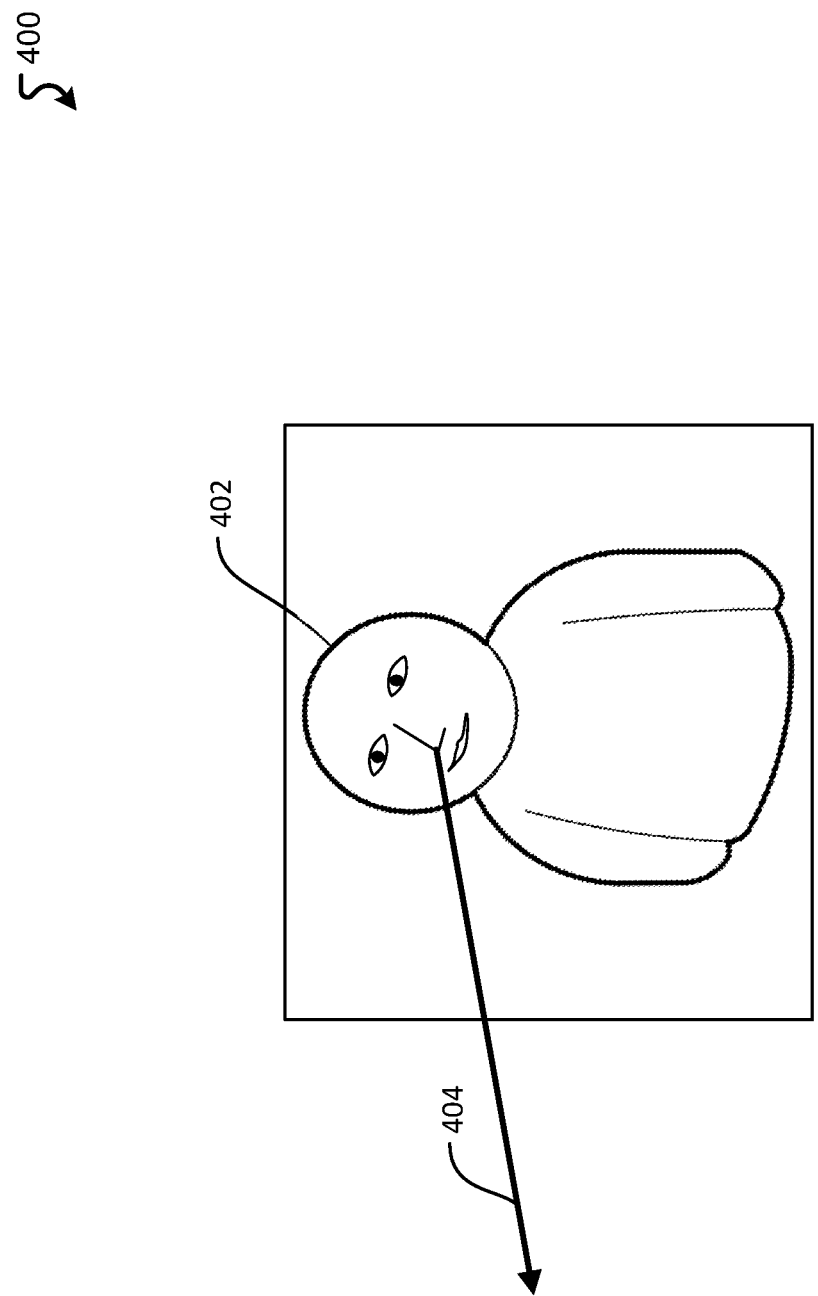
FIG. 4 illustrates an example a head pose in accordance with aspects of the present disclosure.

FIG. 4 illustrates an example of a head pose in accordance with the aspects of the present disclosure. The facial image 400 includes a face 402. A head pose determiner (e.g., the head pose determiner 130 in FIG. 1) determines a head pose 404 based on facial landmarks. In aspects, the facial landmarks include positions and orientations of eyes, a nose, a mouth (or the lips), an outline of the face, and the like. The head pose 404 refers to an orientation of the head of the user in the face image. The orientation may be represented based on head roll, pitch, and yaw information. The head pose determiner determines the head roll, pitch, and yaw information and provides as a feature of the face image into the deep neural network (e.g., the eye-gaze location determiner 126 (fully connected neural networks) in FIG. 1). The explicit addition of the head pose information as a feature of the facial image to the multi-dimensional vector expression of the features based on the image grid improves both accuracy and computing performance of determining the eye-gaze location. In aspects, the head pose information includes one or more of a two-dimensional coordinates and a three-dimensional locations of one or more of a corner of an eye, a tip of a nose, a corner of a mouth, or a tip of a chin. Additionally or alternatively, the head pose information may include a three-dimensional vector in the camera's coordinate space. Without the head pose information, the deep neural network infers the head pose information based at least on the face and the rotation correction image of the image grid.

Figure 5:
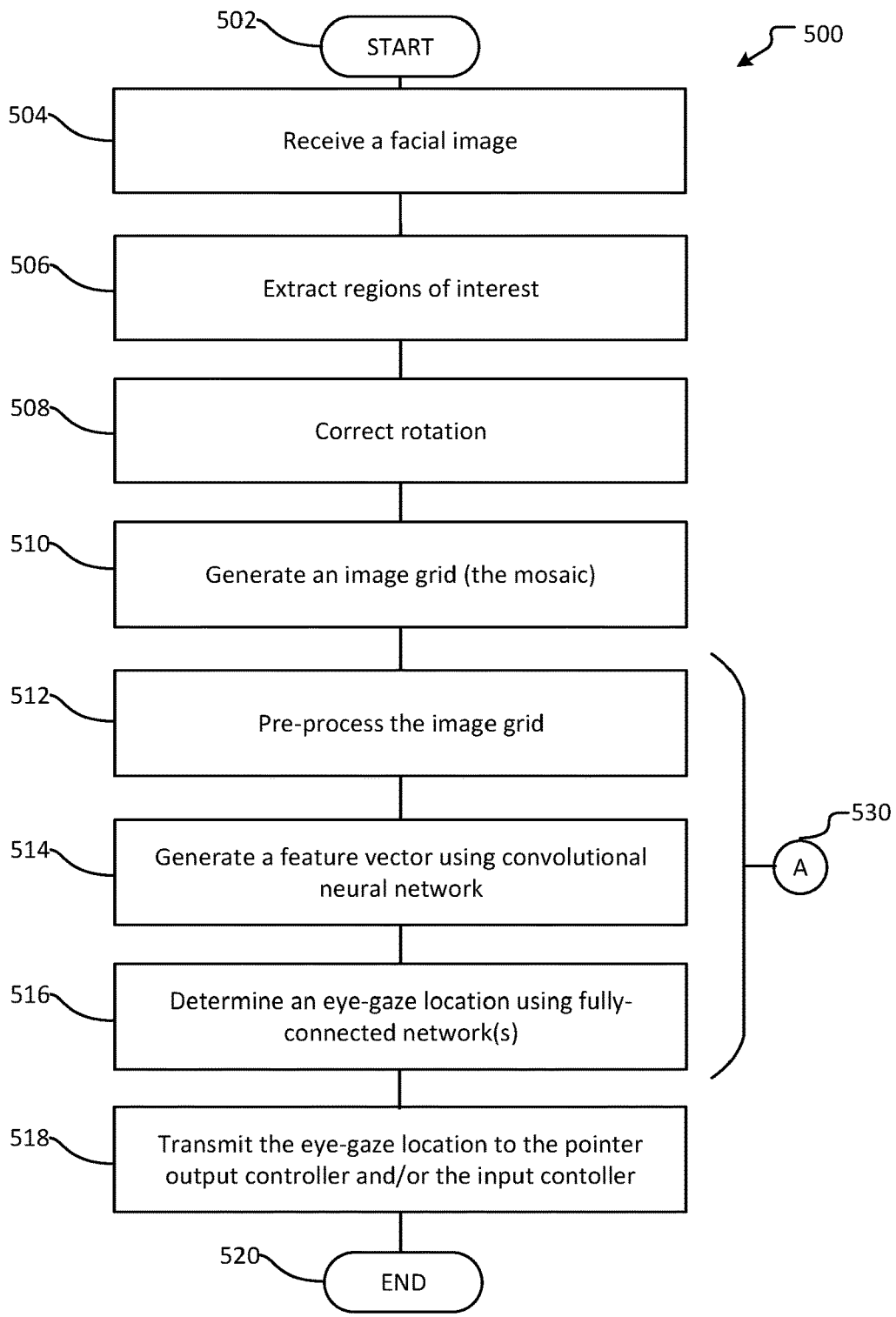
FIG. 5 illustrates an example of a method for gaze tracking in accordance with aspects of the present disclosure.

FIG. 5 is an example of a method for gaze tracking in accordance with aspects of the present disclosure. A general order of the operations for the method 500 is shown in FIG. 5. Generally, the method 500 begins with start operation 502 and ends with end operation 520. The method 500 may include more or fewer steps or may arrange the order of the steps differently than those shown in FIG. 5. The method 500 can be executed as a set of computer-executable instructions executed by a computer system and encoded or stored on a computer readable medium. Further, the method 500 can be performed by gates or circuits associated with a processor, an ASIC, an FPGA, a SOC or other hardware device. Hereinafter, the method 500 shall be explained with reference to the systems, components, devices, modules, software, data structures, data characteristic representations, signaling diagrams, methods, etc., described in conjunction with FIGS. 1, 2A-B, 3, 4, 6, 7, and 8A-B.

Following start operation 502, the method 500 begins with receive operation 504, which receives an image including a facial image. The facial image may include images of the right eye and/or the left eye, a face of the user who interactively operates a computing device. An RGB camera associated with the computing device may capture the facial image. The facial image may be a picture image or a frame of a video data.

Extract operation 506 extracts regions of interest from the facial image. The regions of interests are associated with determining an eye-gaze location. For example, the regions of interests may include the right eye, the left eye, a nose, a face with outlines, and other facial features that enable accurate determination of an eye-gaze location (i.e., a location where the user is looking at).

Correct operation 508 generates a rotational correction image. In aspects, the rotation correction image is a rectangular shape (e.g., the rotational correction image 216 in FIG. 2B) with an orientation that indicates the rotation, size, and location of the face in the captured image. The correct operation 508 generates the rotational correction image based on facial landmarks in the facial image. In aspects, the facial landmarks include locations and orientations of one or both of the eyes, a nose, a mouth, eyebrows, and the like.

Generate operation 510 generates an image grid based on the facial image. In aspects, the image grid includes a plurality of images from regions of interest in a grid. For example, a 2-by-2 image grid may include images of the right eye, the left eye, the face, and the rotational correction image. For example, the image grid may include pixel dimensions of 3×1024×1024. Additionally or alternatively the image grid may include images in other than 2-by-2 layout (e.g., 3 by 3).

Pre-process operation 512 pre-processes the regions of interest for passing a multi-dimensional vector version of the image grid into a deep neural network. In aspects, the pre-process operation 512 includes color space modification and data augmentation. The color space modification may include converting a facial image from the RGB color data format into the YCbCr color space format. For example, use of the YCbCr color space may improve accuracy of detecting skin colors in the facial image because the YCbCr color space encodes color and intensity information separately. Use of the color intensity information improves skin detection.

Generate operation 514 generates a multi-dimensional feature vector based on the eyes and the face in the image grid. In aspects, the generation operation 514 uses a trained convolutional neural network to predict features associated with an eye-gaze location. In some aspects, the convolutional neural network extracts features from respective regions of interest in the image grid concurrently. In particular, the present disclosure leverages from use of extracted features of the face to improve accuracy in extracting features of the eyes based on eyeball information. The generate operation 514 feeding the orientation information of the eyes in the face in determining features of eyeball orientation in the respective eye images.

Determine operation 516 determines an eye-gaze location using one or more fully connected neural networks. For example, the determine operation 516 may use the multi-dimensional feature vector as input to one or more fully connected neural networks. Output of respective one or more fully connected neural network may reduce dimensions of the multi-dimensional feature vector. For example, there may be three full-connected neural networks. Output from the convolutional neural network may be in a multi-dimensional vector with dimensions of 512 by 7 by 7. Output from a first fully connected neural network may be another vector with dimensions of 128. Output from a second fully connected neural network based on the vector with dimensions of 128 as an input may be a vector with dimensions of 64. Output from a third fully connected neural network based on the vector with dimensions of 64 as an input may be a two-dimensional vector. The two-dimensional vector may represent an eye-gaze location in the X-Y coordinates on a display of the computing device.

Transmit operation 518 transmits the eye-gaze location to the pointer controller. The pointer output controller may display an eye-gaze cursor at the eye-gaze location. Additionally or alternatively, the transmit operation 518 transmits the eye-gaze location to input controller when the eye-gaze location is associated with a location of user input. The method 500 ends with the end operation 520. In aspects, 'A' 530 indicates the operations associated with use of the deep neural network.

As should be appreciated, operations 502-520 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 6:
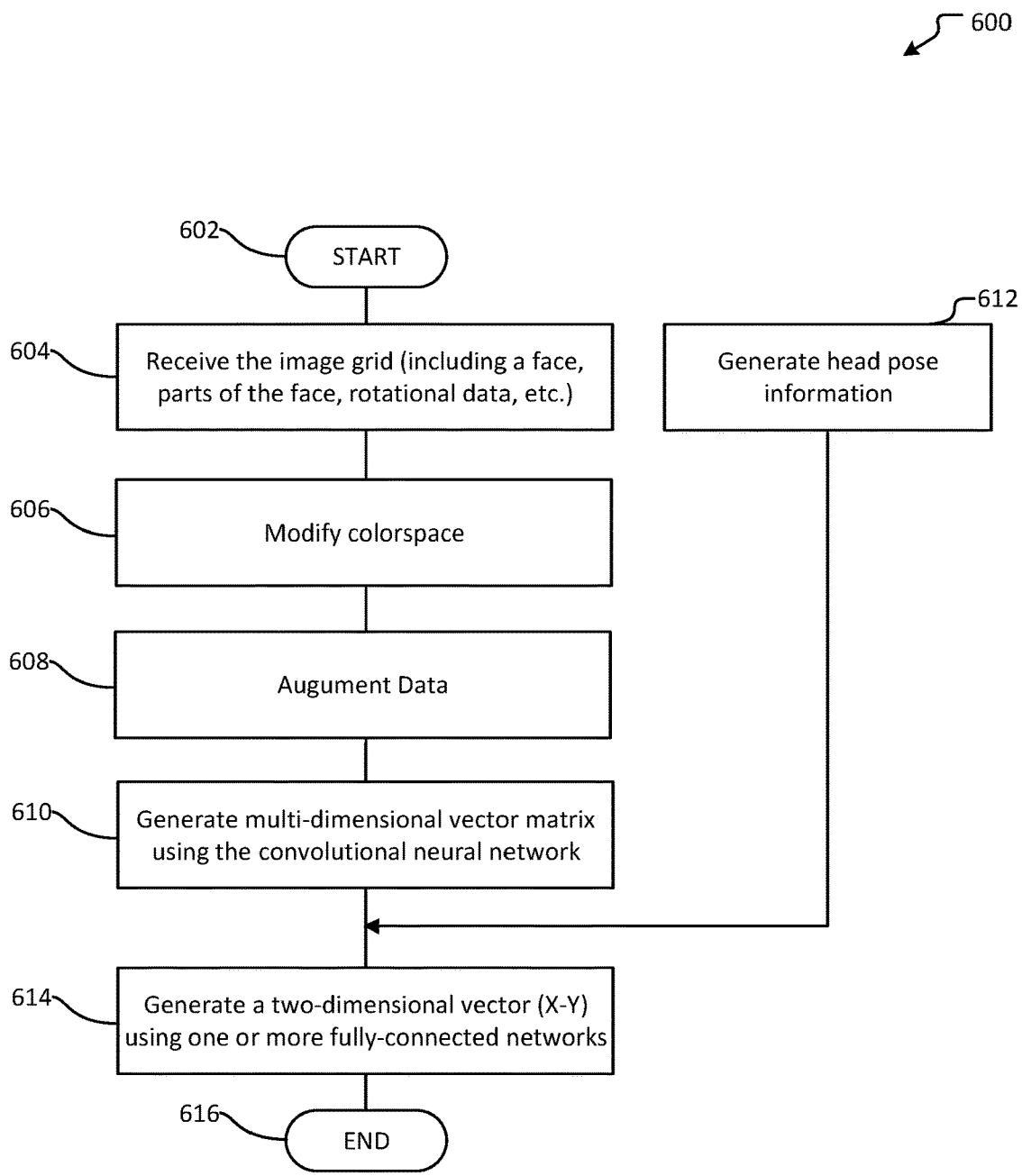
FIG. 6 illustrates an example of a method for gaze-tracking using head-pose information in accordance with aspects of the present disclosure.

FIG. 6 is an example of a method for gaze tracking including use of head pose data in accordance with aspects of the present disclosure. A general order of the operations for the method 600 is shown in FIG. 6. Generally, the method 600 begins with start operation 602 and ends with end operation 616. The method 600 may include more or fewer steps or may arrange the order of the steps differently than those shown in FIG. 6. The method 600 can be executed as a set of computer-executable instructions executed by a computer system and encoded or stored on a computer readable medium. Further, the method 600 can be performed by gates or circuits associated with a processor, an ASIC, an FPGA, a SOC or other hardware device. Hereinafter, the method 600 shall be explained with reference to the systems, components, devices, modules, software, data structures, data characteristic representations, signaling diagrams, methods, etc., described in conjunction with FIGS. 1, 2A-B, 3, 4, 5, 7, and 8A-B.

In particular, the method 600 corresponds to a sequence of steps as represented by 'A' 530 in FIG. 5. Following start operation 602, the method 600 begins with receive operation 604, which receives the image grid. In aspects, the image grid includes regions of interests for determining an eye-gaze location. For example, the image grid may include a face, parts of the face (e.g., the right eye, the left eye, a nose, and the like) and rotational data (e.g., the rotational correction image 216 in FIG. 2).

Modify operation 606 modifies a color space of the image grid. In aspects, the modify operation 606 modifies a color space in RGB into another color space the YCbCr color space to improve accuracy in detecting skin. The modify operation 606 may modify the RGB color space into a non-RGB color space.

Augment operation 608 augments data based on the image grid. In aspects, the augment operation 608 generates variations of the image grid brightness, contract, saturation, hue, and the like. Additionally or alternatively, the augment operation 608 may include a positional augmentation based on image mirroring.

Generate operation 610 generates a multi-dimensional feature vector based on the image grid. In aspects, the generate operation 610 uses a convolutional neural network to determine features associated with an eye-gaze location. The generate operation 610 corresponds to the generation operation 514 in FIG. 5.

Generate operation 612 generates head pose information in a vector expression. One or dimension of the vector expression may correspond to head roll, pitch, yaw information and the like, according to degrees of freedom in kinematic movements. The generate operation 612 may use the facial image associated with the image grid as received by the receive operation 604. The generate operation 612 generates head pose information based on facial landmarks in the facial image. In aspects, the generation 612 may identify the facial landmarks by extracting two-dimensional coordinates of points on the face (e.g., the corners of eyes, the tip of the nose, corners of the mouse, a tip of the chin, and the like) and three-dimensional locations of these points. The generate operation 612 may adjust the two-dimensional coordinates and the three-dimensional locations of these pointes based on a focal length and an optical center of the camera (e.g., the RGB camera). Various algorithms (e.g., a direct linear transformation, Levenberg-Marquardt optimization, Random Sample Consensus, and other applicable algorithms) may estimate the head pose information based on the two-dimensional coordinates and the three-dimensional location of these points. In aspects, the head pose information (the head pose 404 of a facial image 402 in FIG. 4.) indicates head pose estimations as indicated by pitch, roll, and yaw of the head.

The generate operation 614 generates a first feature vector using one or more fully connected neural networks based on an input vector. In aspects, the input vector is a combination of an output vector from the convolutional neural network and the vector expression of the head pose information. Including in this head roll/pitch/yaw information as explicit features into the fully connected neural network enables more accurately predict an eye-gaze location than inferring from the features of the image grid without the information. The generate operation 614 generates a vector expression of an eye-gaze location in two-dimensional coordinates.

Additionally or alternatively, the generate operation 614 may use a series of fully connected neural networks to determine the eye-gaze location in two-dimensional coordinates. In aspects, the generate operation 614 passes an output vector from a first fully connected neural network to a second fully connected neural network. The second fully connected neural network outputs a second vector in reduced dimensions. For example, the output vector from the first fully connected neural network may be generates a second vector at reduced dimensions from the input vector using a second fully connected network. For example, an output from the first fully connected neural network may be a vector with 128 dimensions. The second vector may be 64 dimensions. Similarly, the generate operation 614 may use a third fully connected neural network to determine a vector with two-dimensions as an eye-gaze location in the X-Y coordinates. In aspects, the generate operation 614 may proceed to the transmit operation 518 to transmit the eye-gaze location to one or more controllers in the system.

As should be appreciated, operations 602-618 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 7:
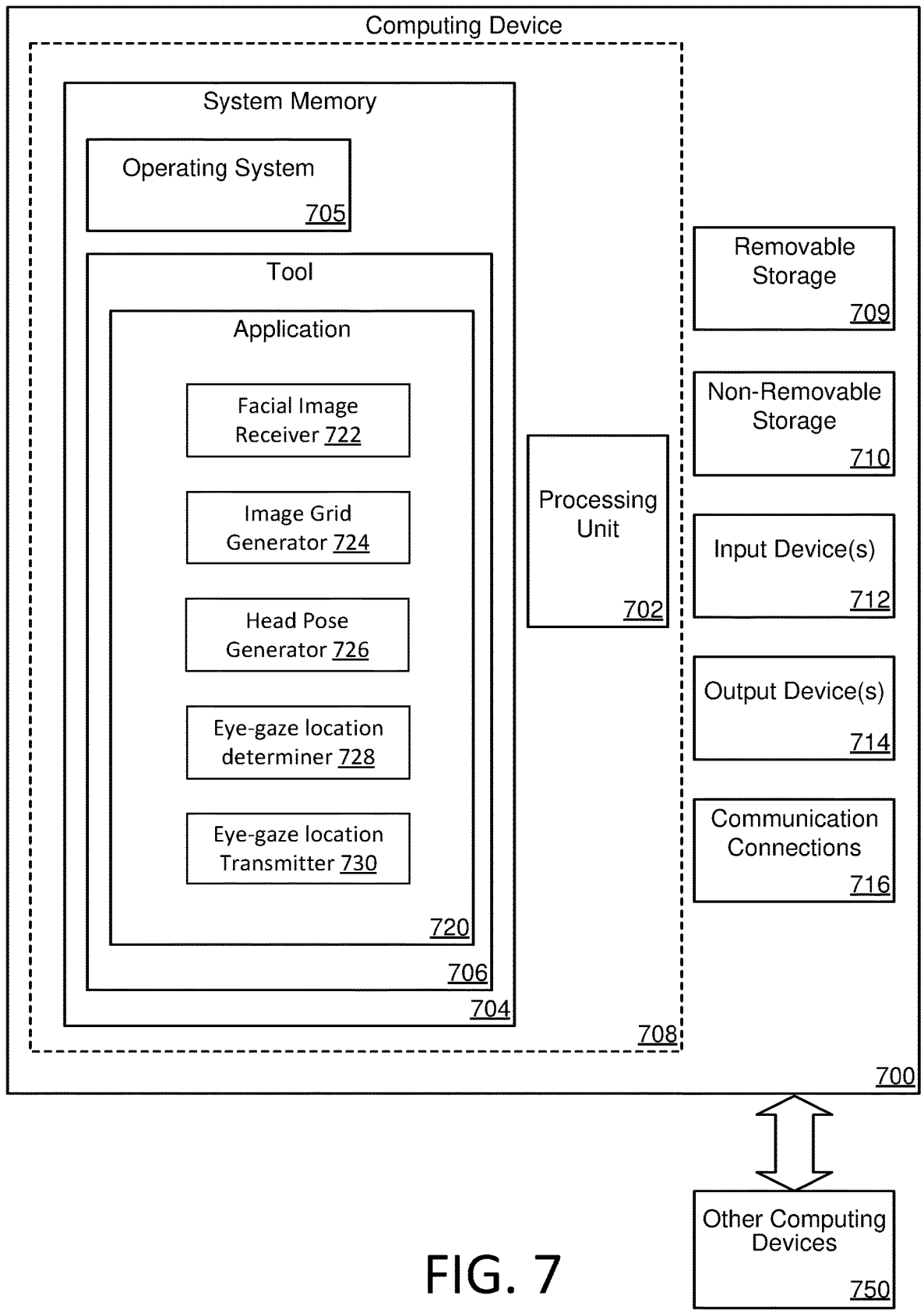
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program tools 706 suitable for performing the various aspects disclosed herein such. The operating system 705, for example, may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program tools and data files may be stored in the system memory 704. While executing on the at least one processing unit 702, the program tools 706 (e.g., an application 720) may perform processes including, but not limited to, the aspects, as described herein. The application 720 includes a facial image receiver 722, an image grid generator 724, a head pose generator 726, an eye-gaze location determiner 728, and an eye-gaze location transmitter 730. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units, and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 700 may also have one or more input device(s) 712, such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of the communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
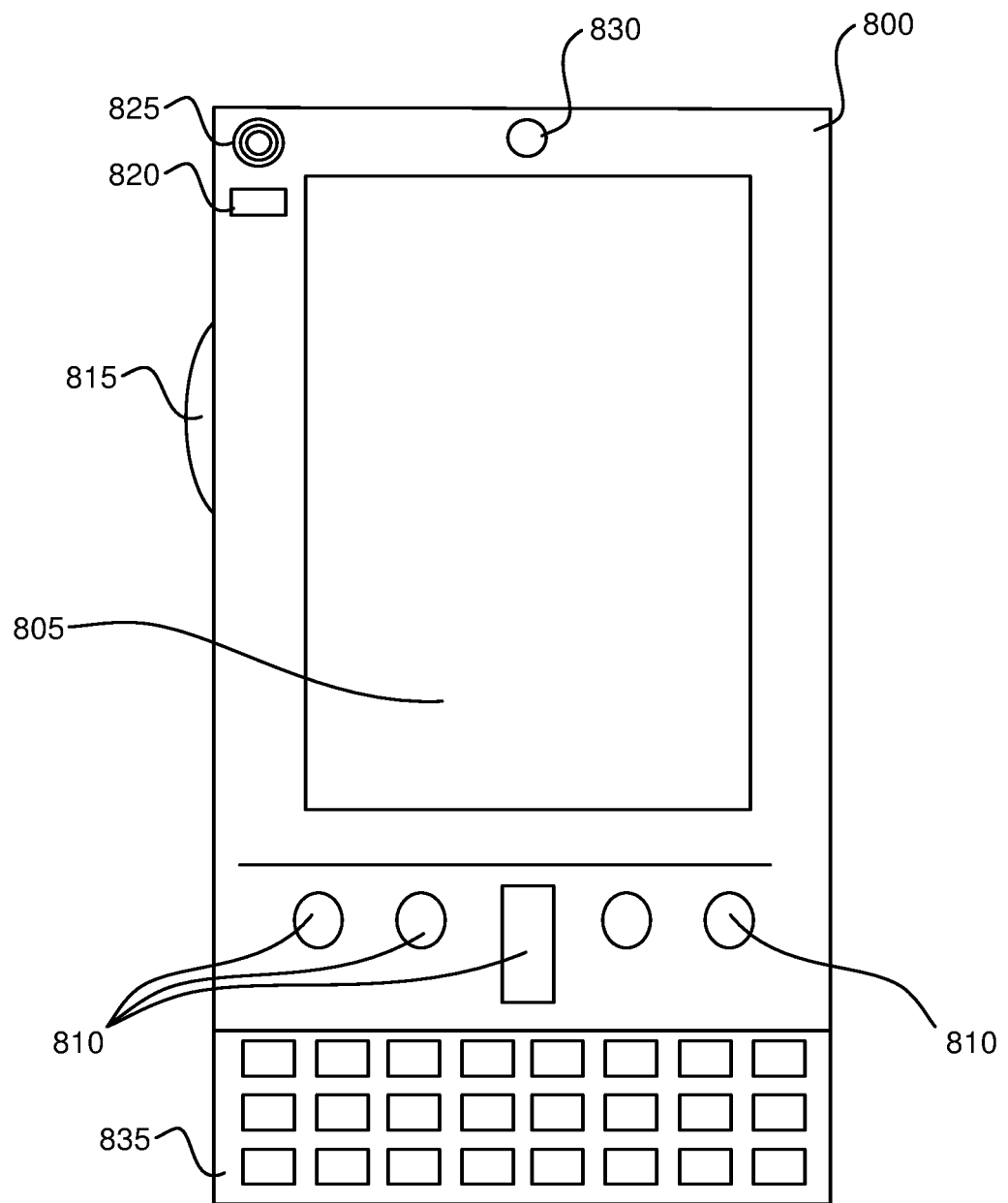
FIG. 8A is a simplified diagram of a mobile computing device with which aspects of the present disclosure may be practiced.
Figure 8B:
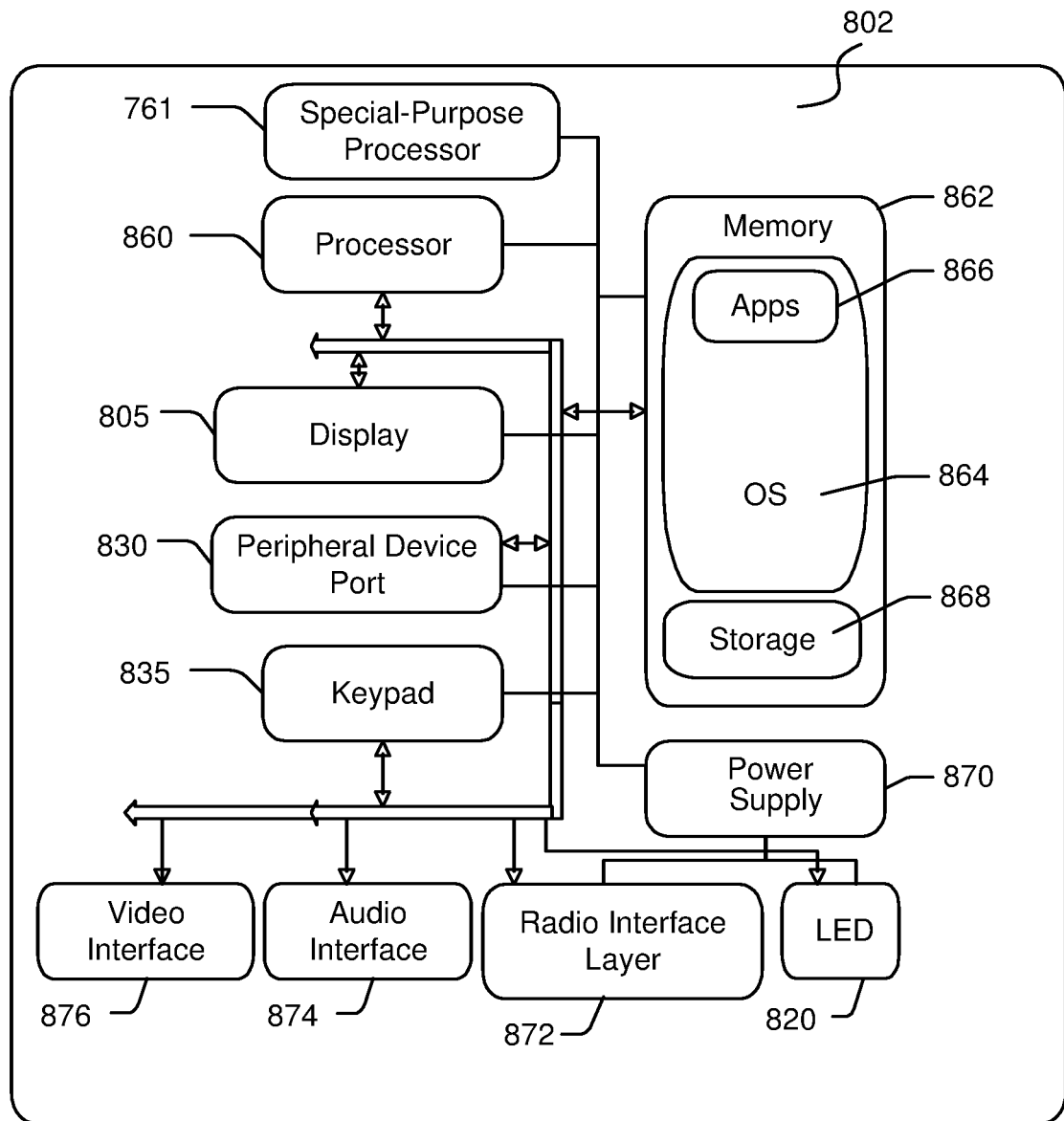
FIG. 8B is another simplified block diagram of a mobile computing device with which aspects of the present disclosure may be practiced.

FIGS. 8A and 8B illustrate a computing device or mobile computing device 800, for example, a mobile telephone, a smart phone, wearable computer (such as a smart watch), a tablet computer, a laptop computer, and the like, with which aspects of the disclosure may be practiced. In some aspects, the client utilized by a user (e.g., as an operator of the system 100 in FIG. 1) may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included as an optional input element, a side input element 815 allows further user input. The side input element 815 may be a rotary switch, a button, or any other type of manual input element. In alternative aspects, mobile computing device 800 may incorporate more or less input elements. For example, the display 805 may not be a touch screen in some aspects. In yet another alternative aspect, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of computing device, a server (e.g., the eye-gaze tracker 110 in FIG. 1), a mobile computing device, etc. That is, the mobile computing device 800 can incorporate a system 802 (e.g., a system architecture) to implement some aspects. The system 802 can implemented as a "smart phone" capable of running one or more applications (e.g., browser, e-mail, calendaring, contact managers, messaging clients, games, and media clients/players). In some aspects, the system 802 is integrated as a computing device, such as an integrated digital assistant (PDA) and wireless phone.

One or more application programs 866 may be loaded into the memory 862 and run on or in association with the operating system 864. Examples of the application programs include phone dialer programs, e-mail programs, information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 (e.g., LED) may be used to provide visual notifications, and/or an audio interface 874 may be used for producing audible notifications via the audio transducer 825. In the illustrated configuration, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods for predicting an eye-gaze location according to at least the examples provided in the sections below. The method comprises receiving an input image, wherein the input image depicting the operator gazing at a location on a screen of a device; extracting a plurality of regions from the input image, wherein the plurality of regions include: one or more eyes, a face, and a region indicating at least a position and a rotation of the face; generating, based on the extracted plurality of regions, an image grid; determining, based on a combination of a convolutional network and a fully-connected network using the image, a predicted location of the eye gaze, wherein the predicted location includes a two-dimensional location of the eye gaze on the screen of the device; and causing, based on the predicted location, one or more actions associated with an operation of the device. The method further comprises generating, based on the input image, head pose information of the operator, wherein the head pose information includes a direction of a head of the operator relative to the screen of the device; generating, based on the image grid using the convolution network trained with a gaze-data prediction model, a multi-dimensional vector; and generating, based on a combination of the multi-dimensional vector and the head pose information using the fully-connected network, the predicted location of the eye gaze. The method further comprises transmitting the predicted location of the eye gaze to an output controller, causing an update to a gaze location indicator on the screen of the device. The method further comprises receiving an input image from an RGB camera, wherein the input image is based on an RGB color space. The image grid includes a combination of: the one or more eyes, the face, a nose, one or more ears, and the region indicating at least a position and a rotation of the face. The convolutional neural network predicts one or more features of the one or more eyes based on one or more of: a feature of the face, and a feature of the region indicating at least a position and a rotation of the face in the image grid. The head pose information includes one or more of a two-dimensional coordinates and a three-dimensional locations of one or more of: a corner of an eye, a tip of a nose, a corner of a mouth, or a tip of a chin.

Another aspect of the technology relates to a system for predicting a location of an eye gaze of an operator. The system comprises a processor; and a memory storing computer-executable instructions that when executed by the processor cause the system to: receive an input image, wherein the input image depicting the operator gazing at a location on a screen of a device; extract a plurality of regions from the input image, wherein the plurality of regions include: one or more eyes, a face, and a region indicating at least a position and a rotation of the face; generate, based on the extracted plurality of regions, an image grid; determine, based on a combination of a convolutional network and a fully-connected network using the image, a predicted location of the eye gaze, wherein the predicted location includes a two-dimensional location of the eye gaze on the screen of the device; and cause, based on the predicted location, one or more actions associated with an operation of the device. The computer-executable instructions that when executed by the processor further cause the system to: generate, based on the input image, head pose information of the operator, wherein the head pose information includes a direction of a head of the operator relative to the screen of the device; generate, based on the image grid using the convolution network trained with a gaze-data prediction model, a multi-dimensional vector; and generate, based on a combination of the multi-dimensional vector and the head pose information using the fully-connected network, the predicted location of the eye gaze. The computer-executable instructions that when executed by the processor further cause the system to: transmit the predicted location of the eye gaze to an output controller, causing an update to a gaze location indicator on the screen of the device. The computer-executable instructions that when executed by the processor further cause the system to: receive an input image from an RGB camera, wherein the input image is based on an RGB color space. The image grid includes a combination of: the one or more eyes, the face, a nose, one or more ears, and the region indicating at least a position and a rotation of the face. The convolutional neural network predicts one or more features of the one or more eyes based on one or more of: a feature of the face, and a feature of the region indicating at least a position and a rotation of the face in the image grid. The head pose information includes one or more of a two-dimensional coordinates and a three-dimensional locations of one or more of: a corner of an eye, a tip of a nose, a corner of a mouth, or a tip of a chin.

In still further aspects, the technology relates to a computer-readable recording medium storing computer-executable instructions. The computer-readable recording medium storing computer-executable instructions that when executed by a processor cause a computer system to: receive an input image, wherein the input image depicting the operator gazing at a location on a screen of a device; extract a plurality of regions from the input image, wherein the plurality of regions include: one or more eyes, a face, and a region indicating at least a position and a rotation of the face; generate, based on the extracted plurality of regions, an image grid; determine, based on a combination of a convolutional network and a fully-connected network using the image, a predicted location of the eye gaze, wherein the predicted location includes a two-dimensional location of the eye gaze on the screen of the device; and cause, based on the predicted location, one or more actions associated with an operation of the device. The computer-executable instructions that when executed by the processor further cause the system to: generate, based on the input image, head pose information of the operator, wherein the head pose information includes a direction of a head of the operator relative to the screen of the device; generate, based on the image grid using the convolution network trained with a gaze-data prediction model, a multi-dimensional vector; and generate, based on a combination of the multi-dimensional vector and the head pose information using the fully-connected network, the predicted location of the eye gaze. The computer-executable instructions that when executed by the processor further cause the system to: transmit the predicted location of the eye gaze to an output controller, causing an update to a gaze location indicator on the screen of the device. The computer-executable instructions that when executed by the processor further cause the system to: receive an input image from an RGB camera, wherein the input image is based on an RGB color space. The image grid includes a combination of: the one or more eyes, the face, a nose, one or more ears, and the region indicating at least a position and a rotation of the face, and wherein the convolutional neural network predicts one or more features of the one or more eyes based on one or more of: a feature of the face, and a feature of the region indicating at least a position and a rotation of the face in the image grid. The head pose information includes one or more of a two-dimensional coordinates and a three-dimensional locations of one or more of: a corner of an eye, a tip of a nose, a corner of a mouth, or a tip of a chin.

Any of the one or more above aspects in combination with any other of the one or more aspect. Any of the one or more aspects as described herein.

What is claimed is:

1. A computer-implemented method for predicting a location of an eye gaze of an operator, the method comprising:
    receiving an input image, wherein the input image depicting the operator gazing at a location on a screen of a device;
    extracting a plurality of regions from the input image, wherein the plurality of regions include:
        one or more eyes,
        a face, and
        a region indicating at least a position and a rotation of the face;
    generating, based on the extracted plurality of regions, an image grid, wherein the image grid includes a plurality of image data, each image data corresponding to a distinct region of the plurality of regions;
    determining, based on a combination of a convolutional network and a fully-connected network using the image grid, a predicted location of the eye gaze, wherein the predicted location includes a two-dimensional location of the eye gaze on the screen of the device; and
    causing, based on the predicted location, one or more actions associated with an operation of the device.

2. The computer-implemented method according to claim 1, the method further comprising:
    generating, based on the input image, head pose information of the operator, wherein the head pose information includes a direction of a head of the operator relative to the screen of the device;
    generating, based on the image grid using the convolution network trained with a gaze-data prediction model, a multi-dimensional vector; and
    generating, based on a combination of the multi-dimensional vector and the head pose information using the fully-connected network, the predicted location of the eye gaze.

3. The computer-implemented method according to claim 1, the method further comprising:
    transmitting the predicted location of the eye gaze to an output controller, causing an update to a gaze location indicator on the screen of the device.

4. The computer-implemented method according to claim 1, the method further comprising:
    receiving an input image from an RGB camera, wherein the input image is based on an RGB color space.

5. The computer-implemented method according to claim 1, wherein the image grid includes a combination of:
    the one or more eyes,
    the face,
    a nose,
    one or more ears, and
    the region indicating at least a position and a rotation of the face.

6. The computer-implemented method according to claim 1, wherein the convolutional neural network predicts one or more features of the one or more eyes based on one or more of:
    a feature of the face, and
    a feature of the region indicating at least a position and a rotation of the face in the image grid.

7. The computer-implemented method according to claim 1, wherein the head pose information includes one or more of a two-dimensional coordinates and a three-dimensional locations of one or more of:
    a corner of an eye,
    a tip of a nose,
    a corner of a mouth, or
    a tip of a chin.

8. A system for predicting a location of an eye gaze of an operator, the system comprising:
    a processor; and
    a memory storing computer-executable instructions that when executed by the processor cause the system to:
        receive an input image, wherein the input image depicting the operator gazing at a location on a screen of a device;
        extract a plurality of regions from the input image, wherein the plurality of regions include:
            one or more eyes,
            a face, and
            a region indicating at least a position and a rotation of the face;
        generate, based on the extracted plurality of regions, an image grid, wherein the image grid includes a plurality of image data, each image data corresponding to a distinct region of the plurality of regions;
        determine, based on a combination of a convolutional network and a fully-connected network using the image grid, a predicted location of the eye gaze, wherein the predicted location includes a two-dimensional location of the eye gaze on the screen of the device; and cause, based on the predicted location, one or more actions associated with an operation of the device.

9. The system according to claim 8, the computer-executable instructions that when executed by the processor further cause the system to:

generate, based on the input image, head pose information of the operator, wherein the head pose information includes a direction of a head of the operator relative to the screen of the device;

generate, based on the image grid using the convolution network trained with a gaze-data prediction model, a multi-dimensional vector; and generate, based on a combination of the multi-dimensional vector and the head pose information using the fully-connected network, the predicted location of the eye gaze.

10. The system according to claim 8, the computer-executable instructions that when executed by the processor further cause the system to:

transmit the predicted location of the eye gaze to an output controller, causing an update to a gaze location indicator on the screen of the device.

11. The system according to claim 8, the computer-executable instructions that when executed by the processor further cause the system to:

receive an input image from an RGB camera, wherein the input image is based on an RGB color space.

12. The system according to claim 8, wherein the image grid includes a combination of:

the one or more eyes,
the face,
a nose,
one or more ears, and
the region indicating at least a position and a rotation of the face.

13. The system according to claim 8, wherein the convolutional neural network predicts one or more features of the one or more eyes based on one or more of:

a feature of the face, and
a feature of the region indicating at least a position and a rotation of the face in the image grid.

14. The system according to claim 8, wherein the head pose information includes one or more of a two-dimensional coordinates and a three-dimensional locations of one or more of:

a corner of an eye,
a tip of a nose,
a corner of a mouth, or
a tip of a chin.

15. A computer-readable storage medium storing computer-executable instructions that when executed by a processor cause a computer system to:

receive an input image, wherein the input image depicting the operator gazing at a location on a screen of a device;

extract a plurality of regions from the input image, wherein the plurality of regions include:

one or more eyes,
a face, and
a region indicating at least a position and a rotation of the face;

generate, based on the extracted plurality of regions, an image grid, wherein the image grid includes a plurality of image data, each image data corresponding to a distinct region of the plurality of regions;

determine, based on a combination of a convolutional network and a fully-connected network using the image grid, a predicted location of the eye gaze, wherein the predicted location includes a two-dimensional location of the eye gaze on the screen of the device; and cause, based on the predicted location, one or more actions associated with an operation of the device.

16. The computer-readable storage medium of claim 15, the computer-executable instructions that when executed by the processor further cause the system to:

generate, based on the input image, head pose information of the operator, wherein the head pose information includes a direction of a head of the operator relative to the screen of the device;

generate, based on the image grid using the convolution network trained with a gaze-data prediction model, a multi-dimensional vector; and generate, based on a combination of the multi-dimensional vector and the head pose information using the fully-connected network, the predicted location of the eye gaze.

17. The computer-readable storage medium of claim 15, the computer-executable instructions that when executed by the processor further cause the system to:

transmit the predicted location of the eye gaze to an output controller, causing an update to a gaze location indicator on the screen of the device.

18. The computer-readable storage medium of claim 15, the computer-executable instructions that when executed by the processor further cause the system to:

receive an input image from an RGB camera, wherein the input image is based on an RGB color space.

19. The computer-readable storage medium of claim 15, wherein the image grid includes a combination of:

the one or more eyes,
the face,
a nose,
one or more ears, and
the region indicating at least a position and a rotation of the face, and wherein the convolutional neural network predicts one or more features of the one or more eyes based on one or more of:

a feature of the face, and
a feature of the region indicating at least a position and a rotation of the face in the image grid.

20. The computer-readable storage medium of claim 15, wherein the head pose information includes one or more of a two-dimensional coordinates and a three-dimensional locations of one or more of:

a corner of an eye,
a tip of a nose,
a corner of a mouth, or
a tip of a chin.

* * * * *